(12) United States Patent
Stenborg (10) Patent No.: US 10,467,771 B2
(45) Date of Patent: Nov. 5, 2019

(54) METHOD AND SYSTEM FOR VEHICLE LOCALIZATION FROM CAMERA IMAGE

(71) Applicant: VOLVO CAR CORPORATION, Gothenburg (SE)

(72) Inventor: Erik Stenborg, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 181 days.

(21) Appl. No.: 15/850,770

(22) Filed: Dec. 21, 2017

(65) Prior Publication Data

US 2018/0204347 A1     Jul. 19, 2018

(30) Foreign Application Priority Data

Dec. 28, 2016   (EP) .................................... 16207096

(51) Int. Cl.
*G06T 7/73*     (2017.01)
*G06K 9/00*    (2006.01)
*G06K 9/62*    (2006.01)

(52) U.S. Cl.
CPC ............ *G06T 7/73* (2017.01); *G06K 9/00208* (2013.01); *G06K 9/00791* (2013.01);
(Continued)

(58) Field of Classification Search
CPC ........... G06K 9/00208; G06K 9/00791; G06K 9/6215; G06K 9/628; G06T 7/73;
(Continued)

(56) References Cited

U.S. PATENT DOCUMENTS 8,301,369 B2 * 10/2012 Hiruta .................... G01C 21/30
                                                                      701/408
9,507,346 B1 * 11/2016 Levinson ............. G05D 1/0214
(Continued)

FOREIGN PATENT DOCUMENTS

EP          2132530 A2      12/2009
JP      2008165275 A   *   7/2008
(Continued)

OTHER PUBLICATIONS

Davison et al. "Simultaneous localization and map-building using active vision." IEEE transactions on pattern analysis and machine intelligence 24.7 (2002): 865-880. (Year: 2002).*
(Continued)

*Primary Examiner* — Katrina R Fujita
(74) *Attorney, Agent, or Firm* — Brooks Kushman P.C.

(57) ABSTRACT

A method for determining a location of a vehicle comprises acquiring a 2D-image, depicting vehicle surroundings, using a vehicle-based camera; classifying pixels in the image such that each classified pixel belongs to one class of a set of classes, thereby forming a classified 2D-image. The method further comprises determining an initial estimated vehicle location and defining possible vehicle locations based on the initial location; matching the classified 2D-image with a 3D-map comprising a plurality of geometric objects that each belong to one class of the set of classes, by comparing a classification of a geometric object in the 3D-map, for a possible vehicle location, with a classification of a corresponding at least one pixel in the classified 2D-image; determining a matching score for at least one possible vehicle location based on matched pixels of the 2D-image; and determining a vehicle location based on the score of the possible vehicle location.

18 Claims, 4 Drawing Sheets

(52) U.S. Cl.
CPC ........... G06K 9/628 (2013.01); G06K 9/6215 (2013.01); *G06T 2207/20081* (2013.01); *G06T 2207/20084* (2013.01); *G06T 2207/30252* (2013.01)

(58) Field of Classification Search
CPC . G06T 2207/20081; G06T 2207/20084; G06T 2207/30252
See application file for complete search history.

(56) References Cited

U.S. PATENT DOCUMENTS

| | | | | |
|---|---|---|---|---|
| 9,606,539 | B1* | 3/2017 | Kentley | G01S 17/023 |
| 9,612,123 | B1* | 4/2017 | Levinson | G01C 21/32 |
| 9,632,502 | B1* | 4/2017 | Levinson | G01S 7/4972 |
| 9,720,415 | B2* | 8/2017 | Levinson | G01S 17/42 |
| 9,754,490 | B2* | 9/2017 | Kentley | G06K 9/00805 |
| 9,965,699 | B2* | 5/2018 | Sorstedt | B60R 1/00 |
| 10,365,658 | B2* | 7/2019 | Fridman | G06K 9/00791 |
| 2005/0238200 | A1* | 10/2005 | Gupta | G06K 9/00201 382/103 |
| 2010/0049391 | A1 | 2/2010 | Nakano | |
| 2012/0310516 | A1* | 12/2012 | Zeng | G01C 21/32 701/300 |
| 2015/0378015 | A1* | 12/2015 | You | G01S 13/06 701/469 |
| 2016/0161265 | A1* | 6/2016 | Bagheri | G01C 21/32 701/450 |
| 2017/0010120 | A1* | 1/2017 | Shashua | G01C 21/32 |
| 2017/0123422 | A1* | 5/2017 | Kentley | B60H 1/00735 |
| 2017/0123428 | A1* | 5/2017 | Levinson | G05D 1/0214 |
| 2017/0123429 | A1* | 5/2017 | Levinson | G05D 1/0088 |
| 2017/0124476 | A1* | 5/2017 | Levinson | G05D 1/0088 |
| 2017/0124781 | A1* | 5/2017 | Douillard | G01S 15/931 |
| 2017/0126810 | A1* | 5/2017 | Kentley | H04L 67/125 |
| 2017/0132334 | A1* | 5/2017 | Levinson | G06F 17/5009 |
| 2017/0132934 | A1* | 5/2017 | Kentley | G08G 1/202 |
| 2017/0316333 | A1* | 11/2017 | Levinson | G01S 17/87 |
| 2018/0045519 | A1* | 2/2018 | Ghadiok | G06F 16/5866 |
| 2018/0136651 | A1* | 5/2018 | Levinson | G05D 1/0044 |
| 2019/0227553 | A1* | 7/2019 | Kentley-Klay | G05D 1/0088 |

FOREIGN PATENT DOCUMENTS

| | | |
|---|---|---|
| WO | 2008113861 A2 | 9/2008 |
| WO | 2015/156821 A1 | 10/2015 |

OTHER PUBLICATIONS

Qu et al. "Vehicle localization using mono-camera and geo-referenced traffic signs." 2015 IEEE Intelligent Vehicles Symposium (IV). IEEE, 2015. (Year: 2015).*
Wei et al. "Augmenting vehicle localization accuracy with cameras and 3d road infrastructure database." European Conference on Computer Vision. Springer, Cham, 2014. (Year: 2014).*
Extended European Search Report dated Jan. 24, 2018, Application No. 17192794.0-1207, Applicant Volvo Car Corporation, 6 Pages.
Extended European Search Report dated Jun. 12, 2017, Application No. 16207096.5-1901, Applicant Volvo Car Corporation, 8 Pages.

* cited by examiner

METHOD AND SYSTEM FOR VEHICLE LOCALIZATION FROM CAMERA IMAGE

CROSS-REFERENCE TO RELATED APPLICATIONS

This application claims foreign priority benefits under 35 U.S.C. § 119(a)-(d) to European patent application number EP 16207096.5, filed Dec. 28, 2016, which is incorporated by reference in its entirety.

TECHNICAL FIELD

The present disclosure relates to a method and system for determining the position of a vehicle based on semantically segmented camera images.

BACKGROUND

Along with the introduction of driver assistance systems and fully or partially self-driving cars, it is becoming increasingly important to accurately determine the location of the vehicle.

Localization of a self-driving vehicle is for example proposed to be solved using multiple redundant technologies, of which local sensing (such as radar, lidar and cameras) in combination with a map of recognizable landmarks is one major component.

However, a problem when performing localization using camera images is to create a map which is invariant to the visual changes that occur over time in the environment surrounding the vehicle. Changes in lighting during the day, changing weather, seasonal variation, etc. may cause significant changes in the appearance of the same scene, making it difficult to extract features from the images that remain constant.

Current solutions are able to extract image features (e.g., SIFT, SURF, ORB), build a map based on the image features and to localize the vehicle in this map shortly after. To have a map that works at all times some experiments have been made to continuously add image features as they change appearance over time and thus keeping the map updated. However, this approach has drawbacks because of an ever-growing map, and that each area must be revisited relatively soon so that not too many of the last set of features have changed to be able to localize.

Another approach includes place recognition where one does not localize with the same precision, using triangulation of landmarks, but where the objective is to get a rough idea of where the image was taken. This approach has proven more robust against temporal changes, but has too low precision to be useful for self-driving cars.

Accordingly, there is room for improvement relating to the localization of vehicles using camera images.

SUMMARY

In view of above-mentioned and other drawbacks of the prior art, it is an object of the present disclosure to provide an improved method and system for determining the position of a vehicle.

According to a first aspect of the disclosure, there is provided a method for determining a location of a vehicle, the method comprising acquiring a two-dimensional image, 2D-image, using a vehicle-based camera, the image depicting a portion of the vehicle surroundings; classifying a plurality of pixels in the image such that each classified pixel belong to one class out of a predetermined set of classes, thereby forming a classified 2D-image, wherein the classification is performed by means of a learning algorithm. The method further comprises determining an initial estimated vehicle location and defining a plurality of possible vehicle locations based on the initial estimated vehicle location. Next, the method comprises matching the classified 2D-image with a three dimensional map, 3D-map, comprising a plurality of geometric objects, each geometric object belonging to one class out of the predetermined set of classes, by comparing a classification of a geometric object in the 3D-map, for a possible vehicle location, with a classification of a corresponding at least one pixel in the classified 2D-image; determining a matching score for at least one possible vehicle location based on a plurality of matched pixels of the 2D-image; and determining a vehicle location based on the score of the at least one possible vehicle location.

In the present description, it is assumed that the 3D-map is formed prior to using the described method, and the 3D-map is thus stored in the vehicle or otherwise accessible to the vehicle. Moreover, the predetermined set of classes used to classify pixels in the 2D-image is based on predetermined classes existing in the 3D-map.

The main principle of the described method is that for a given captured 2D-image, the image is matched against the 3D-map for a possible vehicle location. Each possible vehicle location corresponds to a point of view in the 3D-map. Accordingly, the captured 2D-image is matched against different "viewpoints" in the 3D-map, corresponding to the possible vehicle locations. Thereby, in a simplified description, for the possible vehicle location being closest to the actual location, the classified pixels of the 2D-image can be assumed to have the best correspondence with the classified geometric objects of the 3D-map, thereby determining the correct location of the vehicle.

The present disclosure is based on the realization that a more efficient method can be achieved by classifying objects in the 3D-map and pixels in the 2D-image, and subsequently matching the classified objects. This removes the requirement of uniquely identifiable objects in the surrounding, which takes up large amounts of storage space since identifiers for each individual object must be stored. Moreover, feature based localization using image feature descriptors to identify objects in images is sensitive to changes in appearance of the image features, meaning that a given descriptor may not recognize an image feature if the appearance has changed. Such variations may occur naturally over time, for example including seasonal variations. Object classification, on the other hand, is easier to make invariant to such variations.

Furthermore, by using learning algorithms, the classification of the 2D-image can be improved over time to increase the accuracy of the classification and thereby of the location determination.

Accordingly, the described method provides a method for vehicle localization with increased efficiency and with high accuracy by using object and pixel classification.

According to one embodiment of the disclosure, matching may comprise projecting a plurality of geometric objects in the 3D-map onto a 2D-plane, and comparing a classification of the plurality of geometric objects projected onto the 2D-plane with a classification of a corresponding at least one pixel in the classified 2D-image. Hereby, the projected objects form a corresponding "2D-map", simplifying the matching between the 3D map and the 2D image.

According to one embodiment of the disclosure, the 2D-plane corresponds to an image plane of the 2D-image. Hereby, only objects in the 3D map which can be assumed to be visible in the 2D-image are projected onto the 2D-plane. Accordingly, geometrical objects which are not in the line-of-sight of the assumed vehicle position are not projected. Thereby, the amount of objects being projected is reduced, simplifying the matching processing.

According to one embodiment of the disclosure, matching may comprise projecting at least one pixel of the 2D-image into the 3D-map to form a conical volume in the 3D-map having a cross section corresponding to a cross section of the pixel. A pixel typically has a square cross section, meaning that the four corners of the pixel are projected into the 3D-map to form a cone (i.e., a pyramid) in the 3D-map. Matching can thus be performed by comparing the class of the pixel with a class of an object within the projected volume in the 3D-map, if an object is present within the volume.

According to one embodiment of the disclosure determining a matching score may comprise assigning a weight to each geometric object within the conical volume, wherein the weight is based on a distance between the geometrical object and an image plane of the 2D-image in the 3D-map. Thereby, when a volume comprises multiple geometrical objects, objects which are nearer the image plane of the 2D-image can be given a higher weight compared to objects which are further away when matching the pixel class against the object class. Accordingly, even though a conical volume may comprise objects which are not visible from the perspective of the vehicle, such objects can be given a lower weight. A weight may for example be 0 or 1.

According to one embodiment of the disclosure matching may comprise projecting at least one pixel of the 2D-image onto a geometric object in the 3D-map, and comparing a classification of the geometric object with a classification of the projected at least one pixel in the classified 2D-image.

According to one embodiment of the disclosure a location of a point in the 3D-map corresponds to a 2D-point in the image plane. The image plane is a plane in a 3D-space where the location of the pixels can be determined by two coordinates. Accordingly, projecting the pixels in the 2D-image into the 3D-map can be seen as forming the image plane in the 3D space.

According to one embodiment of the disclosure, classifying pixels of the 2D-image may comprise classifying only pixels in locations of the 2D-image corresponding to locations of geometrical objects in the 3D-map. Accordingly, pixels in the 2D-image can be mapped against corresponding geometrical objects in the 3D-map prior to classification of the pixels, thereby making the method more computationally efficient since fewer pixels require classification.

According to one embodiment of the disclosure, the method may further comprise selecting a subset of the classes and matching only pixels and geometrical objects belonging to the subset of classes. Hereby, the classification of pixels is performed, but only pixels belonging to the subset of classes is subsequently matched against geometrical objects in the 3D-map, which in turn makes the location determination faster. The selection of a subset of classes may for example be based on an estimated location, if it is known that there are no objects belonging to certain classes in the vicinity of the vehicle. Moreover, a known location of the camera in the vehicle may also be used to select a subset of classes.

According to one embodiment of the disclosure, the geometric object in the 3D-map may represented by a point in the 3D-map, and wherein the point corresponds to one pixel in the classified 2D-image.

Moreover, the geometric object in the 3D-map may be represented by a surface or a volume in the 3D-map. In principle, the size of a surface or a volume may correspond to only one pixel. However, in practice, each surface or volume will correspond to a plurality of pixels in the classified 2D-image.

According to one embodiment of the disclosure, the initial vehicle location may be based on a previous determination of a vehicle location. Accordingly, if the method for determining a location of a vehicle has been executed recently, an approximate position of the vehicle may be known. An estimation of the initial vehicle location may for example be based on a previous determined location in combination with a vehicle velocity.

According to one embodiment of the disclosure, the initial vehicle location may be based on a vehicle location acquired from a GPS measurement. The initial vehicle location may also be determined based on a combination of the above methods.

According to one embodiment of the disclosure, the predetermined set of classes may comprise predetermined semantic classes, meaning that the classes are relatable to actual objects, such as a house, a building or a tree.

An advantage of using semantic classes is that a supervised machine learning algorithm can be used where human input is used to define objects in order to train the algorithm.

According to one embodiment of the disclosure the predetermined set of classes are determined by means of the learning algorithm. The set of classes have then been determined in a learning stage of the learning algorithm, which for example may be performed when creating the 3D-map. By allowing the learning algorithm to define the classes, it may be possible to reach a definition of classes which is more suitable for localization compared to classes defined by humans. Moreover, an unsupervised machine learning algorithm can be much more time-efficient if the need for human interaction during the learning process is reduced or eliminated.

According to one embodiment of the disclosure, the learning algorithm may be a convolutional neural network, which has shown to be well suited for image classification. Alternatively, a support vector machine may be used.

According to one embodiment of the disclosure, defining a plurality of possible vehicle locations based on the initial estimated vehicle location comprises using a Bayesian filter.

According to a second aspect of the disclosure, there is provided a system in a vehicle for determining a position of a vehicle, the system comprising a camera configured to acquiring a two-dimensional image, 2D-image depicting a portion of the vehicle surroundings a storage unit having stored thereon a three-dimensional map, 3D-map, comprising a plurality of geometric objects, each geometric object belonging to one class out of a predetermined set of classes; and an image processing unit. The image processing unit is configured to: classify a plurality of pixels in the image such that each classified pixel belongs to one class out of the predetermined set of classes, thereby forming a classified 2D-image, wherein the classification is performed by means of a learning algorithm; determine an initial estimated vehicle location; define a plurality of possible vehicle locations based on the initial estimated vehicle location; match the classified 2D-image with the 3D-map by comparing a classification of a geometric object in the 3D-map, for a possible vehicle location, with a classification of a corresponding at least one pixel in the classified 2D-image;

determine a matching score for at least one possible vehicle location based on a plurality of matched pixels of the 2D-image; and determine a vehicle location based on the score of the at least one possible vehicle location.

Additional effects and features of the second aspect of the disclosure are largely analogous to those described above in connection with the first aspect of the disclosure.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the attached drawings.

DETAILED DESCRIPTION

In the present detailed description, various embodiments of the method and system according to the present disclosure are mainly described with reference to a method of determining a location of a car. However, the described method may equally well be used for other types of vehicles.

Figure 1:
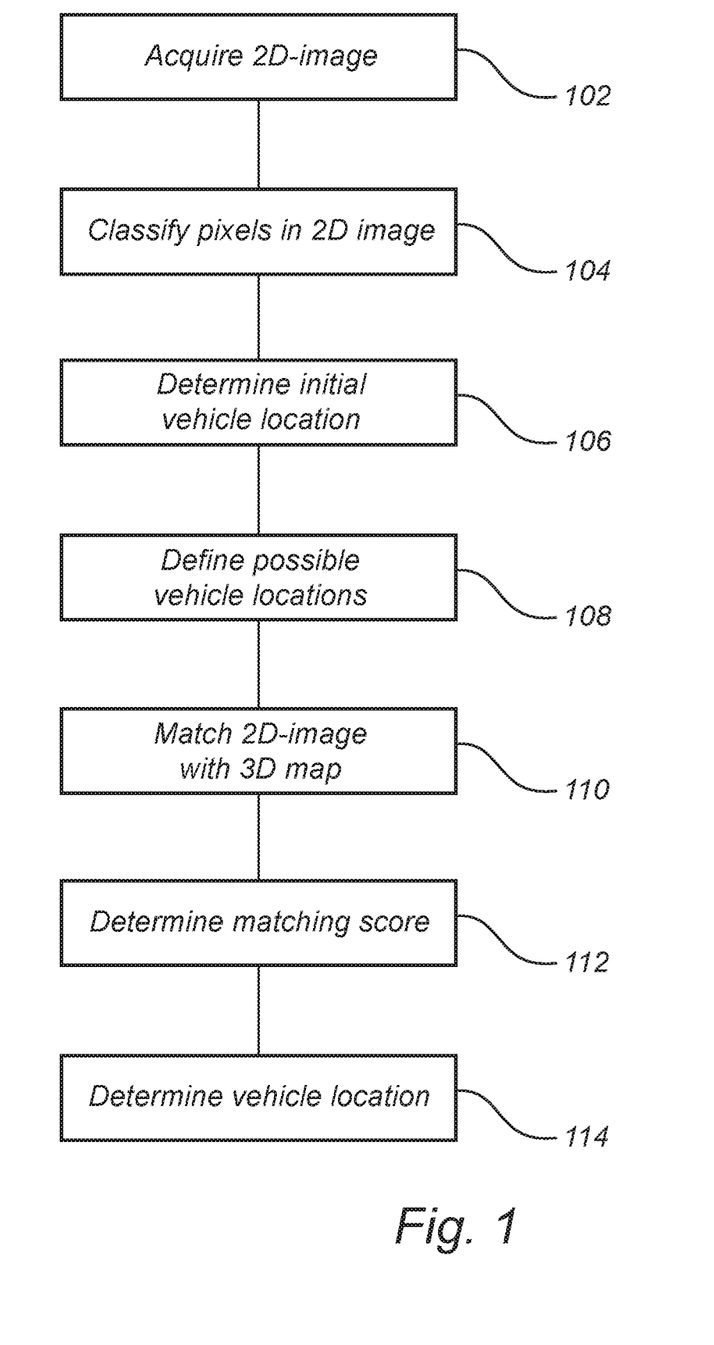
FIG. 1 is a flow chart outlining the general steps of a method according to an embodiment of the disclosure.

FIG. 1 is a flow chart outlining the general steps of a method for determining a location of a vehicle according to an embodiment of the disclosure. The method of FIG. 1 will be discussed with reference to the system 200 illustrated in FIG. 2, and with reference to FIGS. 3A-B schematically illustrating selected steps of the method.

Figure 2:
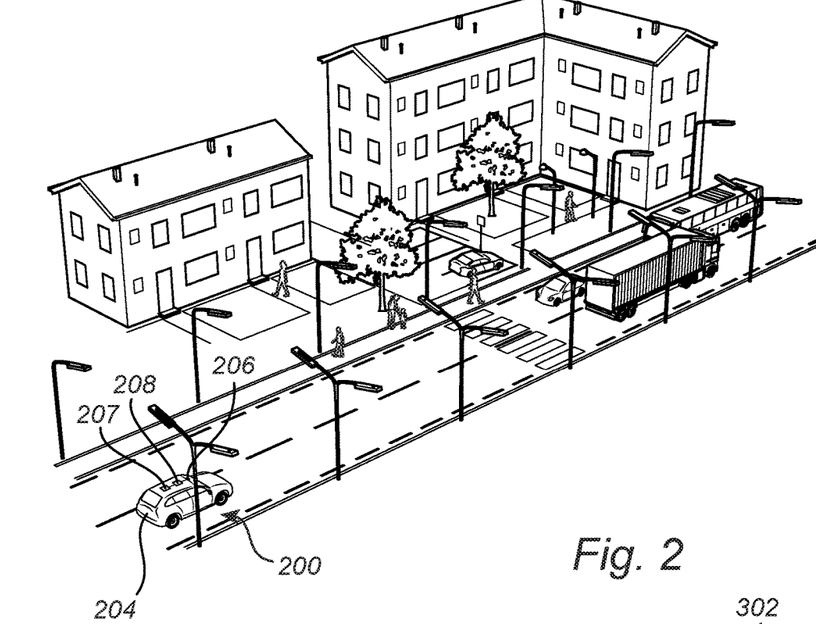
FIG. 2 schematically illustrates a system according to an embodiment of the disclosure.
Figure 3A:
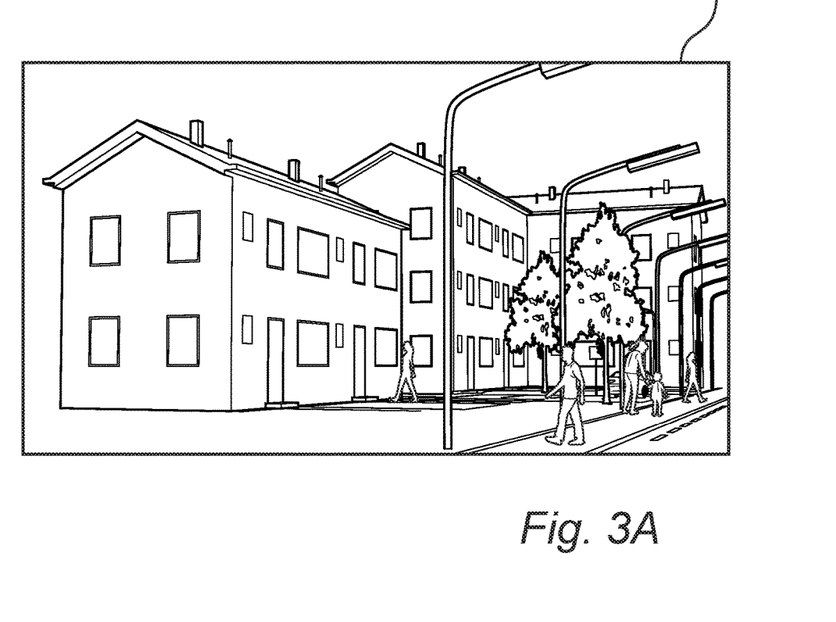
FIGS. 3A and 3B schematically illustrate a feature of a method according to an embodiment of the disclosure.
Figure 3B:
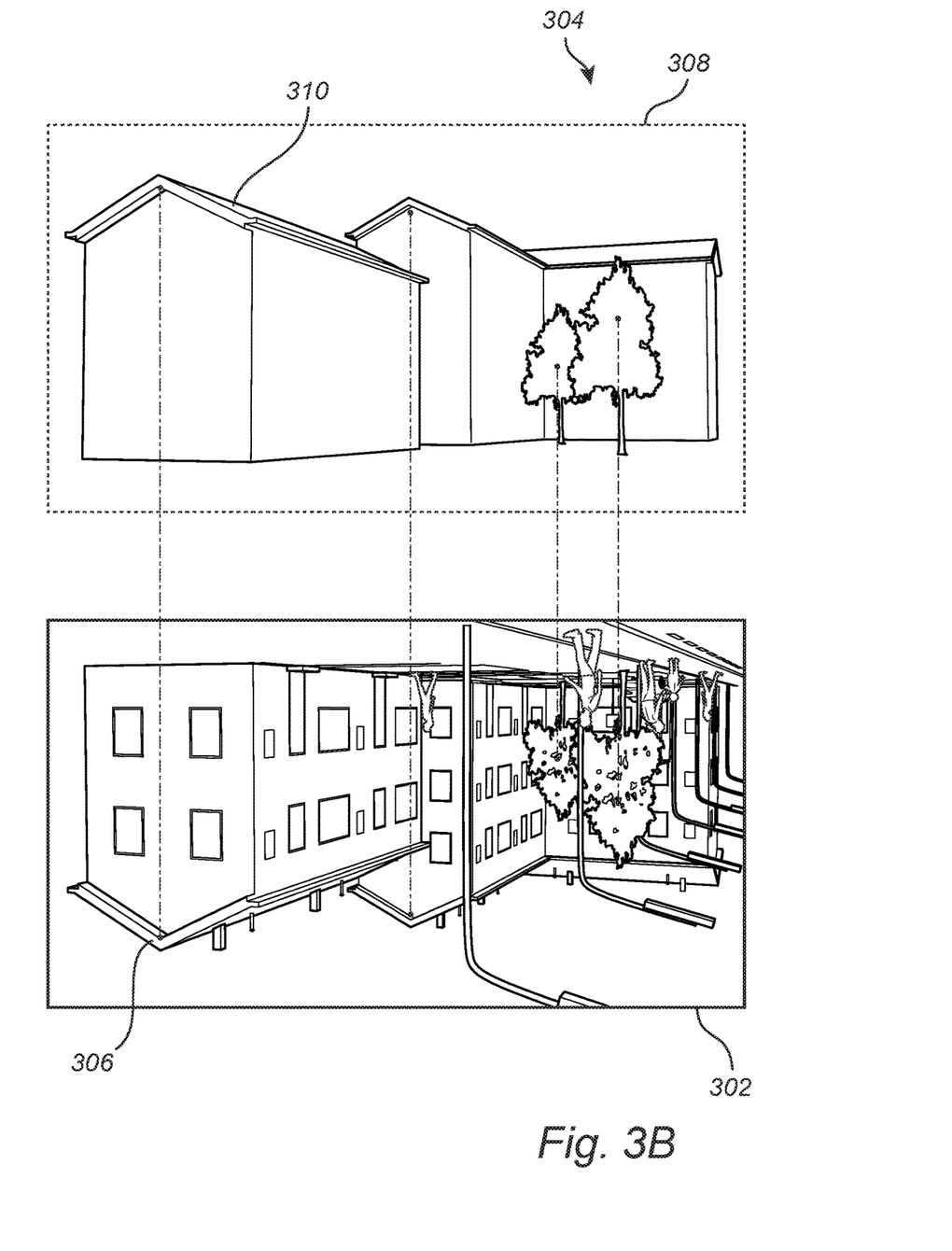

FIG. 2 illustrates a vehicle 204 comprising a vehicle mounted camera 206 configured to capture an image of the vehicle surroundings, and an image processing unit 208 coupled to the camera 206. The camera 206 may be a video camera 206 acquiring a live image feed of the surroundings, or it may be a still camera 206 capturing images at selected intervals or points in time.

In a first step of the method, the camera 206 acquires 102 a two-dimensional image, 2D-image, the image depicting a portion of the vehicle surroundings. A 2D-image 302 is schematically illustrated in FIG. 3A.

Next, the method comprises classifying 104 a plurality of pixels in the image 302 such that each classified pixel belongs to one class out of a predetermined set of classes, thereby forming a classified 2D-image. The classification 104 is performed by means of a learning algorithm. Often, the classifier determines a probability for each pixel of belonging to each class, i.e., for each pixel there will be N numbers, where N is the number of classes, and for each pixel the N numbers will sum to 1 (since the pixel must have one class). Example output for one pixel: tree 0.6, building 0.05, ground 0.3, vehicle 0.05 (if we only have those four classes). This can either be reduced to one class, by selecting the most likely class. One could also match the probability function of the map point to a corresponding probability function in the detected pixel and calculate a probability divergence which is simply a number ranging from 0 (the probability functions are the same) to 1 (the probability functions are completely different).

A straightforward approach is to classify all of the pixels in the 2D-image. However, it may be possible to only classify a subset of pixels in order to reach a classified 2D-image which is sufficient for accurate matching. The present, simplified, example is illustrated using three different semantic classes; "building", "tree", and "road", thus defining the predetermined set of classes. Here. It can be assumed that only pixels considered to belong to one of the three classes are given a classification.

In a following step, an initial vehicle location is determined 106. The initial vehicle location can for example be based on a previously determined vehicle location, based on the described method. The initial vehicle location may also be determined based on a GPS-position, and/or on an inertial measurement system or the like. Based on the initial estimated vehicle location, a plurality of possible vehicle locations are defined 108. The possible vehicle locations may for example be defined using a Bayesian filter. In a Bayesian filter for location, the possible locations are represented by a probability density over a state which is typically continuous in 3D position, and there may be additional elements encoded in the state besides position, such as velocity. Bayesian filters are further based on the assumption that there is connection between state distributions over time which can be described by a motion model. It is often assumed that the motion model is a Markov process, meaning that if a distribution is known from a previous time step, no additional information before the previous step is required for modeling the subsequent time step. The Bayesian filter may be configured to describe a distribution of possible locations using a number of particles in a particle filter, a point mass filter or various types of Kalman filters.

Accordingly, once a plurality of possible vehicle locations have been defined 108, the following matching 110 step is performed for at least one of the locations, and preferably for a plurality of the possible locations.

A possible vehicle location defines a vehicle coordinate in the 3D-map. The 3D-map is described as being stored on a storage unit 207 in the vehicle 200, thereby being available to the image processing unit 208. However, the it is also possible that the 3D-map, or at least parts of the 3D-map, is stored remotely to the vehicle and accessible through wireless communication.

For the given coordinate, the classified 2D-image is matched against the 3D-map. A pixel in the 2D-image is matched against a geometrical object in the 3D-map, where a geometrical object may be represented by a point, a surface or a volume, i.e., a 1D, 2D or 3D object in the 3D-map, where each object has a class and a coordinate. For simplicity, the objects of the 3D-map 304 illustrated in FIG. 3B can be considered to be represented by surfaces, i.e., 2D-objects. However, the matching principle is the same independent of the dimensionality of the object.

A pixel 306 in the 2D-image is projected onto the image plane 308 in the 3D-map 304. The pixel 306 has been classified to belong to the "building" class. The pixel 306 is thus projected onto an object of the 3D map, the object here being a surface having the classification "building". Accordingly, there is a match between the class of the pixel 306 and the class of the object 310. The 2D-object can for example be represented by surface triangles, Gaussian processes or other known 2D-object representations.

Here, the projection is described as being a projection of the pixel onto a 2D-image plane of the 3D-map. However, this is equivalent with a projection of a geometrical object of the 3D-map onto the classified 2D-image, and it can be assumed that both projections provide the same result.

If it is known, or can be assumed with a high probability, that the vehicle is in a location where objects belonging to certain classes are not present, i.e., if the vehicle is driving on a city street without trees, the class "tree" can be omitted both when classifying the 2D-image and when performing the matching, thereby providing a faster classification and matching process.

Once the selected number of pixels, or all of the pixels, have been matched in a corresponding manner, a total matching score is determined 112 for the possible vehicle location. Next, a new possible vehicle location can be selected, leading to a slightly different representation of the 3D-map, which subsequently most likely would provide a different matching score.

Finally, when matching has been performed for all of the selected possible vehicle locations, a vehicle location can be determined 114 based on the one or more matching scores. If the score is selected with care so that it corresponds to the likelihood for that position to give rise to the observed classified image, standard Bayesian filtering can be used to combine it with the density from the previous time step into a posterior density. From this posterior density, an estimate of position can be extracted by for example finding the maximum of the probability density (MAP estimate), or by minimizing the expected error of the estimate (MMSE estimate).

Figure 4:
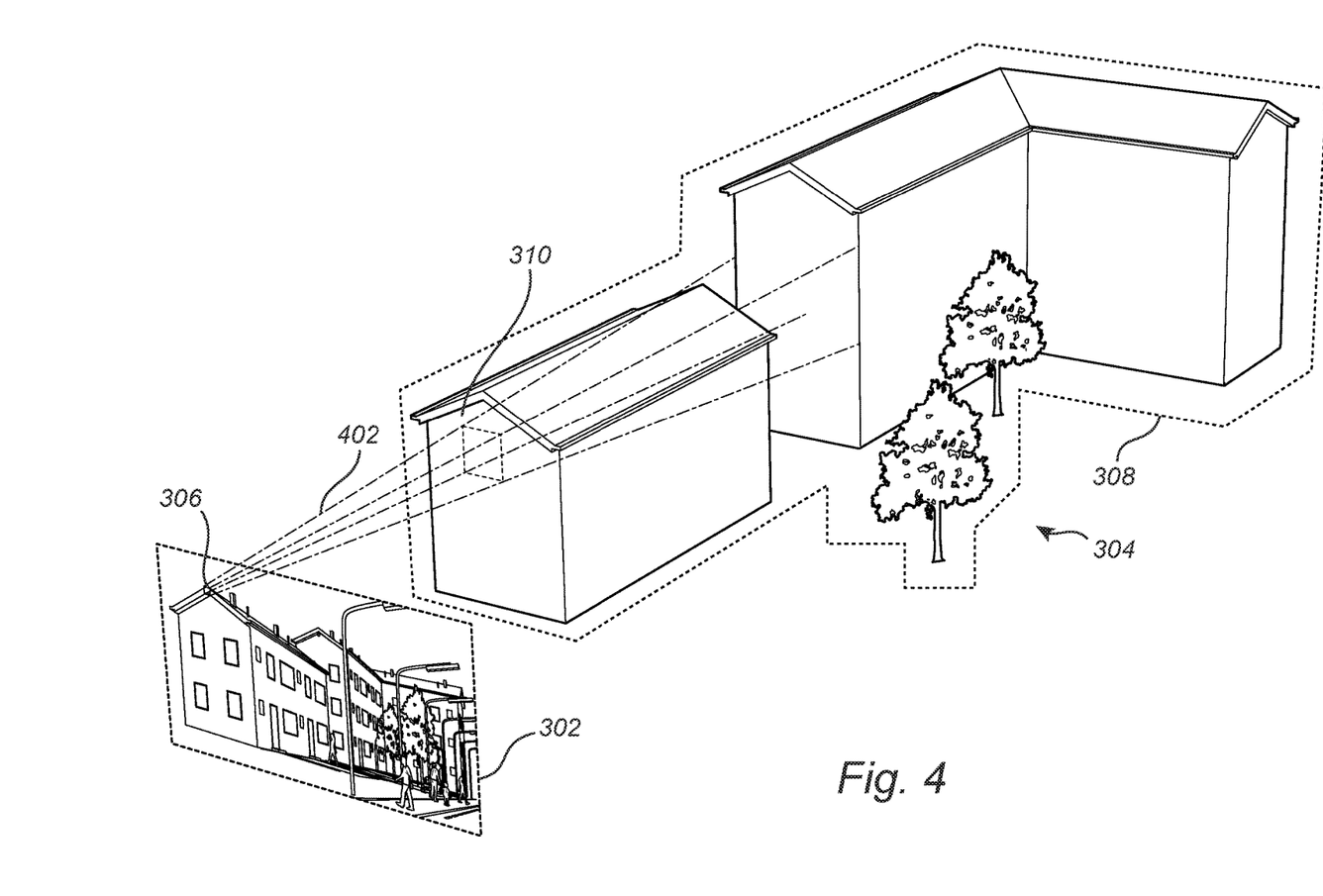
FIG. 4 schematically illustrates a feature of a method according to an embodiment of the disclosure.

FIG. 4 schematically illustrates an example embodiment of the method where a pixel 306 of the 2D-image 302 is projected into the 3D-map 304 to form a conical volume 402 in the 3D-map having a cross section corresponding to a cross section of the pixel, which is here a rectangular cross section, thereby providing a pyramidal volume. The matching will then comprise comparing the class of the pixel with the class of an object within the conical volume 402. In FIG. 4, it can be seen that the volume 402 intersects the "house" object 310.

In the above description, it is assumed that the 3D-map with object classification is pre-existing and available in the vehicle. The 3D-map can be formed by means of a convolutional neural network performing semantic or non-sematic classification of objects. Correspondingly, the convolutional neural network can be used to classify the pixels in the acquired 2D-image.

It should be noted that the image processing unit 208 and any other system, subsystem, device, module, or unit described herein may individually, collectively, or in any combination comprise appropriate circuitry, such as one or more appropriately programmed processors (e.g., one or more microprocessors including central processing units (CPU)) and associated memory, which may include stored operating system software and/or application software executable by the processor(s) for controlling operation thereof and for performing the particular algorithms represented by the various functions and/or operations described herein, including interaction between and/or cooperation with each other. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip).

Even though the disclosure has been described with reference to specific exemplifying embodiments thereof, many different alterations, modifications and the like will become apparent for those skilled in the art. Also, it should be noted that parts of the method may be omitted, interchanged or arranged in various ways, the method yet being able to perform the functionality of the present disclosure.

Additionally, variations to the disclosed embodiments can be understood and effected by the skilled person in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A method for determining a location of a vehicle, the method comprising:
   acquiring a two-dimensional image, 2D-image, using a vehicle-based camera, the image depicting a portion of vehicle surroundings;
   classifying a plurality of pixels in the image such that each classified pixel belongs to one class out of a predetermined set of classes, thereby forming a classified 2D-image, wherein the classification is performed by means of a learning algorithm;
   determining an initial estimated vehicle location;
   defining a plurality of possible vehicle locations based on the initial estimated vehicle location;
   matching the classified 2D-image with a three-dimensional map, 3D-map, comprising a plurality of geometric objects that each belong to one class out of the predetermined set of classes, by comparing a classification of a geometric object in the 3D-map, for a possible vehicle location, with a classification of a corresponding at least one pixel in the classified 2D-image;
   determining a matching score for at least one possible vehicle location based on a plurality of matched pixels of the 2D-image; and
   determining a vehicle location based on the score of the at least one possible vehicle location.

2. The method according to claim 1, wherein matching comprises projecting a plurality of geometric objects in the 3D-map onto a 2D-plane, and comparing a classification of the plurality of geometric objects projected onto the 2D-plane with a classification of a corresponding at least one pixel in the classified 2D-image.

3. The method according to claim 2, wherein the 2D-plane corresponds to an image plane of the 2D-image.

4. The method according to claim 1, wherein matching comprises projecting at least one pixel of the 2D-image into the 3D-map to form a conical volume in the 3D-map having a cross section corresponding to a cross section of the pixel.

5. The method according to claim 4, wherein determining a matching score comprises assigning a weight to each geometric object within the conical volume, wherein the weight is based on a distance between the geometrical object and an image plane of the 2D-image in the 3D-map.

6. The method according to claim 1, wherein matching comprises projecting at least one pixel of the 2D-image onto a geometric object in the 3D-map, and comparing a classification of the geometric object with a classification of the projected at least one pixel in the classified 2D-image.

7. The method according to claim 6, wherein a location of a point in the 3D-map corresponds to a 2D-point in the image plane.

8. The method according to claim 1, wherein classifying pixels of the 2D-image comprises classifying only pixels in locations corresponding to locations of geometrical objects in the 3D-map.

9. The method according to claim 1 further comprising selecting a subset of the classes and matching only pixels and geometrical objects belonging to the subset of classes.

10. The method according to claim 1, wherein the geometric object in the 3D-map is represented by a point in the 3D-map, and wherein the point corresponds to one pixel in the classified 2D-image.

11. The method according to claim 1, wherein the geometric object in the 3D-map is represented by a surface or a volume in the 3D-map, and wherein the surface or volume corresponds to a plurality of pixels in the classified 2D-image.

12. The method according to claim 1, wherein the initial estimated vehicle location is based on a previous determination of a vehicle location.

13. The method according to claim 1, wherein the initial estimated vehicle location is based on a vehicle location acquired from a GPS measurement.

14. The method according to claim 1, wherein the predetermined set of classes comprises predetermined semantic classes.

15. The method according to claim 1, wherein the predetermined set of classes is determined by means of the learning algorithm.

16. The method according to claim 1, wherein the learning algorithm is a convolutional neural network.

17. The method according to claim 1, wherein defining a plurality of possible vehicle locations based on the initial estimated vehicle location comprises using a Bayesian filter.

18. A system for a vehicle for determining a position of the vehicle, the system comprising:
   a camera configured to acquire a two-dimensional image, 2D-image, depicting a portion of vehicle surroundings;
   a storage unit having stored thereon a three-dimensional map, 3D-map, comprising a plurality of geometric objects, each geometric object belonging to one class out of a predetermined set of classes; and
   an image processing unit configured to:
      classify a plurality of pixels in the image such that each classified pixel belongs to one class out of the predetermined set of classes, thereby forming a classified 2D-image, wherein the classification is performed by means of a learning algorithm;
      determine an initial estimated vehicle location;
      define a plurality of possible vehicle locations based on the initial estimated vehicle location;
      match the classified 2D-image with the 3D-map by comparing a classification of a geometric object in the 3D-map, for a possible vehicle location, with a classification of a corresponding at least one pixel in the classified 2D-image;
      determine a matching score for at least one possible vehicle location based on a plurality of matched pixels of the 2D-image; and
      determine a vehicle location based on the score of the at least one possible vehicle location.

* * * * *